US011153729B2

(12) United States Patent
Cobb

(10) Patent No.: US 11,153,729 B2
(45) Date of Patent: Oct. 19, 2021

(54) TAG AND TAP™

(71) Applicant: Amanda Cobb, Dothan, AL (US)

(72) Inventor: Amanda Cobb, Dothan, AL (US)

( * ) Notice: Subject to any disclaimer, the term of this patent is extended or adjusted under 35 U.S.C. 154(b) by 0 days.

(21) Appl. No.: 16/747,020

(22) Filed: Jan. 20, 2020

(65) Prior Publication Data

US 2021/0227359 A1 Jul. 22, 2021

(51) Int. Cl.
| | |
|---|---|
| *G06Q 30/06* | (2012.01) |
| *G06Q 20/32* | (2012.01) |
| *G06Q 20/36* | (2012.01) |
| *H04W 4/00* | (2018.01) |
| *H04W 4/23* | (2018.01) |
| *H04W 4/021* | (2018.01) |
| *H04W 4/80* | (2018.01) |

(52) U.S. Cl.
CPC ............. *H04W 4/23* (2018.02); *G06Q 20/36* (2013.01); *H04W 4/021* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 7,756,467 B2* | 7/2010 | Bent | ...................... | H04W 4/02 |
| | | | | 455/3.04 |
| 9,082,267 B2* | 7/2015 | Rosenberg | ......... | G06Q 30/0633 |
| 9,516,458 B2* | 12/2016 | Ito | ........................ | H04B 5/0056 |
| 9,552,579 B2* | 1/2017 | Griffin | ................ | G06Q 20/108 |
| 9,727,879 B2* | 8/2017 | Suomela | ................ | G06Q 30/02 |
| 9,947,183 B2* | 4/2018 | Priebatsch | ............... | G06K 7/08 |
| 9,953,354 B2* | 4/2018 | Pallakoff | ............ | G06Q 30/0623 |
| 10,122,842 B2* | 11/2018 | Lee | ......................... | H04W 4/80 |
| 10,380,849 B2* | 8/2019 | Priebatsch | ......... | G06Q 20/3274 |
| 10,395,238 B2* | 8/2019 | Griffin | ................ | G06Q 20/105 |
| 10,423,951 B2* | 9/2019 | Khan | ...................... | G06Q 20/36 |
| 2014/0231502 A1* | 8/2014 | Marsico | ............. | G06Q 30/0203 |
| | | | | 235/375 |
| 2015/0281227 A1* | 10/2015 | Fox Ivey | .............. | H04L 63/083 |
| | | | | 713/168 |
| 2017/0272565 A1* | 9/2017 | Lee | ......................... | H04W 4/80 |
| 2018/0218124 A1* | 8/2018 | Gorelick | ............... | G16H 10/65 |

\* cited by examiner

*Primary Examiner* — Tuan A Tran
(74) *Attorney, Agent, or Firm* — Ronald Baker, Esq.

(57) ABSTRACT

The present invention is a method and system of utilizing dynamic NFC data in a manner that communicates data to a user's personal devices. The embodiment allows such devices to be remotely updated and changed to gives the system the ability to share information. The Tag and Tap™ system will provide push notifications and broadcast messages to users in a manner that have not been previously utilized with NFC technology.

6 Claims, 4 Drawing Sheets

TAG AND TAP™

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

A near field communication tag (NEC tag) is an antenna embedded in a product such as a sticker, label, or wristband etc. with small microchips that can be read b in range mobile devices. NEC tags are a unique technology in that it is ideal for interaction between two or more devices that are equipped with the technology. Traditionally, NFC devices can share static data and generally such data cannot be changed once shared between various devices. Individuals that use NFC technology have to rely on information that is non-interactive once the NFC reader transmits the data to a user. When a user desires to utilize such technology, the data cannot be parsed and re-used for other purposes. Accordingly, what is needed in the art is a dynamic method of transmitting data when utilizing NFC technology that will provide a user with a unique experience. What is further needed in the art is a reliable method of remotely interacting with an individual utilizing such technology that can interface with a mobile device in a novel manner.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
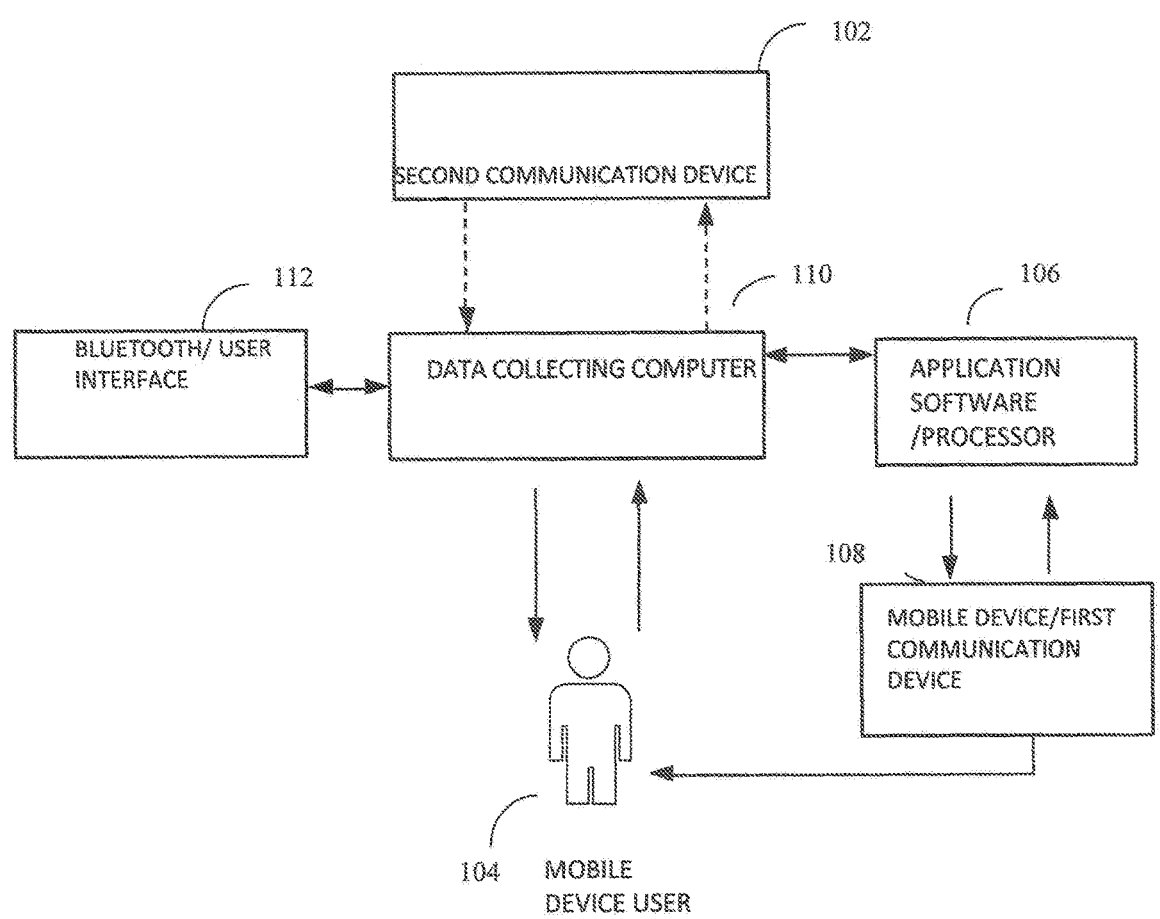
FIG. 1 is a system diagram for an exemplary system configuration consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to a beacon refers to a low energy Bluetooth (BLE) device operating as a proximity activation system that transmits packets of data that allow smart devices (such as phones, tablets, computers, handheld devices, smart watches, game devices, etc.) to be informed when they are in range, and where smart devices are capable of calculating their proximity to the beacon.

Reference throughout this document to a first communication device refers to a variety of components that operates using any means of Internet connection or similar modem that transmits packets of data that allow smart devices (such as phones, tablets, computers, handheld devices, smart watches, game devices, etc.) to be updated when they receive data. The ability of a mobile device to collect such data is important when compiling critical information to relay to the user.

Reference throughout this document to a second communication device refers to a variety of components that operates using any means of Internet connection or similar modem that transmits packets of data that allow the Data Collecting Computer to interface with the first communication device.

Reference throughout this document to "retargeting" is the method of users of the Tag and Tap™ system to receive information and communicate with those who have previously interacted with affiliated NFC tags.

Reference throughout this document to "tapping" or "touching" is the method of users of a mobile device application software to interface with an NFC tag by physically placing an affiliated mobile device within proximity of the NFC tag in a manner that will allow the device to receive data from the NFC tag. Once the process of tapping is completed a URL link will appear on the mobile device. For Android systems the tapping can also take place by touching the NFC tag.

Headings of sections provided in this patent application and the title of this patent application are for convenience only and are not to be taken as limiting the disclosure in any way.

The general public interacts with NFC data on a regular basis whether or not it is in their homes or in public venues such as shopping malls. Utilizing information provided by a user, such as sporting preferences, provides highly accurate data that can be utilized in conjunction with a user's device or other personal effects which can be configured to receive NFC data. The embodiment allows NFC tags to be remotely altered at any given time for a user's interests or personal preferences. Generally, the proposed embodiment will allow users to download a Tag and Tap™ mobile wallet pass to their mobile device via a mobile wallet or a digital wallet which will provide them with the capability to receive push notifications, Geo targeted messages, make payments, receive coupons, rewards and share with others for referral incentives etc. It must be noted that for mobile phones, the Tag and Tap mobile application is currently required for iPhones 7, 8, and 10 to read NFC tags, but the NFC reader app will be live for these phones shortly; all other phones will have pre-existing capabilities for the Tag and Tap™ NFC functions. Once the NFC tag has been tapped, a URL link, video link, music link, text, photo, or embedded codes and the like will appear on the mobile device which will allow the Tag and Tap™ system to interact with the mobile device in a manner that will alter a user's mobile data. In an exemplary embodiment, the Tag and Tap™ system can access a users' information via websites and mobile wallet passes upon receiving prior permission. The permitted information can be shared within the mobile wallet pass via referral programs or even digital black book for consumers such as coupons, fundraising cards, or other discounts. It will be appreciated that the embodiment can utilize a multitude of beacon locations to ensure adequate data transmission.

In a non-limiting example, the Tag and Tap™ product line will include various designed products such as coasters, jewelry, key rings, etc. that will include NFC tags that can be easily tapped by a user's mobile device once the affiliated application has been downloaded. A product with an NFC tag will enable users to interface their mobile device with the NFC tag by simply "tapping" the tag. In an exemplary embodiment, if the device has an android operating system then the "tapping process" can be completed by simply touching the android device to the NFC tag. Once the user has been directed to a URL, the Tag and Tap™ system will include within the functionality readily accessible videos, pictures, songs, text, and other embedded functions which have the ability to change at any time. In a non-limiting example, the system will also be able to read and download a vCard. As another example, when attached to a Mobile Wallet Pass functionality the Tag and Tap™ system will be able to capture information from the user as a means of sending push notifications; additionally, the Tag and Tap™ system will store data and time stamp in a non-volatile memory. For illustrative purposes, the embodiment will generate links that can be utilized for various purposes depending on user preference. The link can also include various messages including videos, and social media sites. In a non-limiting example, the embodiment may include personalized messages such as Nick Saban saying "Roll Tide" for college football fans.

The embodiment can also benefit businesses in various ways such as through advertising means for increased sells. As an example, a business will be able to subscribe to monthly services that allow the business to follow consumers by retargeting users who have "tapped" and or purchased services affiliated to certain links. To explain, if a user's mobile application use has been identified via a store beacon through BLE technology then a business may retarget a user by sending phone notifications, emails, or text messages promoting opportunities for customers to save 10% on future purchases for instance. As an alternative, this can be initiated by a store or a user. If an individual user decides to utilize such services, they can directly subscribe to a monthly loyalty rewards program which will allow them to receive push notifications via emails or text messages that will outline services provided by participating businesses. In a non-limiting example, business logos and promotional videos can be included within the URL link when a user directly Taps a NFC tag or such logos and videos can be included with push notifications once a participating store subscribes or a user signs-up for the loyalty rewards programs. By way of example and not of limitation, once subscribed, a business will be able to utilize services that can provide historical information that will outline the number of interested customers, locations, and what type of products and services that have been scanned.

In additional non-limiting examples, the embodiment can provide a method to allow users to auto redeem loyalty rewards by using predetermined values submitted by users. As an example, once a user elects to subscribe to the loyalty program the Tag and Tap™ system will utilize critical information such as name, phone number, email, and other essential information to allow users to earn points every time an NFC tag is tapped. This capability is endless in that users of all lifestyles can reap the benefits of the Tag and Tap™ system and receive automated information.

Additionally, in an alternate embodiment, the Tag and Tap™ application processor may provide an estimation of how long a particular affiliation may be relevant for commercial or monetization purposes once associated with a particular device, and the timing of the association may be updated or modified based upon the user affiliation that has been determined for the particular device owner or user. Affiliations may be established with a pre-set decay period, where the decay period is set based upon business rules maintained and managed by the system. In a non-limiting example, an affiliation may be established for a beacon that is located within a retail store. The decay period may be set to provide a benefit to customers in recognition of certain behaviors, such as a coupon for frequent customers to the store. In this example, the decay period may be set to be very short as window shopping can be a frequent event and the retail store may want to encourage that frequency to increase the wallet spend, of frequent shoppers.

Turning now to FIG. 1, this figure presents a system diagram for an exemplary system configuration consistent with certain embodiments of the present invention. A system for interfacing with data on a user's mobile device 100 and transmitting such data to a second communication device 102. A user may initiate the software system by utilizing the mobile device application 106. When the system is initiated, the data collecting computer 110 receives collected data through Bluetooth technology 112, containing the user's stored data to the second communication device which transmits data to the application software server 106. The Tag and Tap™ software server 106 stores the transmitted information data in the data collecting computer 110 containing all of the collected data, either automatically by the Tap and Tag™ system or include another acceptable manner in the known art.

Upon the conclusion of this operation, the Tag and Tap™ system has a table of beacon information and associated data regarding the number of mobile device activations near the proximity activation system 100, the type of place in which the proximity activation system 100 is installed, and the precise physical location of the proximity activation system 100 within that location, and has determined and assigned an affiliation to the owner or user of the mobile device.

Figure 2:
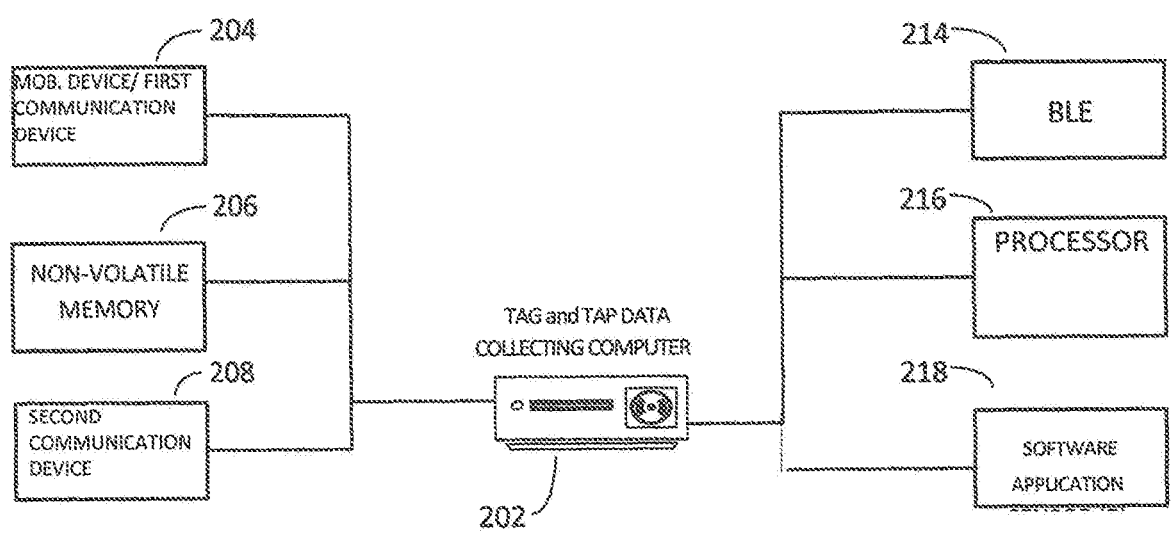
FIG. 2 is a system diagram for loading NFC affiliations onto a device consistent with certain embodiments of the present invention.

Turning to FIG. 2, this figure presents a system diagram for an exemplary system configuration consistent with certain embodiments of the present invention. This figure presents a diagram for bow a data collecting computer 202 will transmit and receive data between various components when the Tag and Tap™ system is operational. The mobile device 204 captures data and stores non-volatile memory in a cache 206 which continuously collects data from the software application 218. The collected data is submitted to a non-volatile memory cache 206 and is maintained by a processor 216. The mobile device 204 is in contact with a second communicating device 208 in a method of providing an enhanced experience for the overall communication system. Each mobile device 204 may have multiple applications 218 installed on the device 204 based upon a user's affiliation. The installed application 218 to each mobile device 204 is connected to software application 218 associated with the mobile device 204. The affiliation assigned to the mobile device 204 can be retrieved for management and tracking of information.

Figure 3:
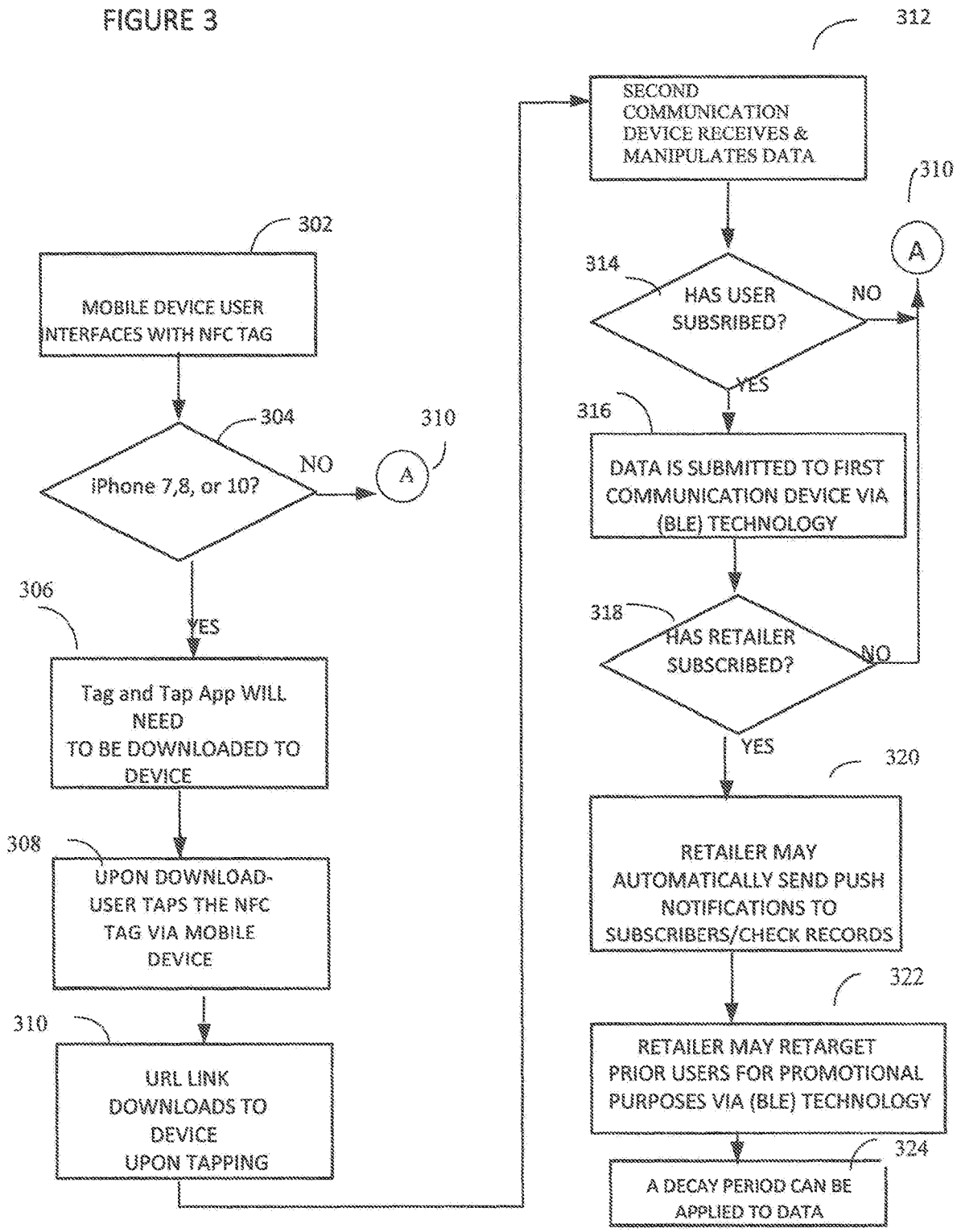
FIG. 3 is a process flow for the determination of user data for an affiliated device consistent with certain embodiments of the present invention.

Turning to FIG. 3, this figure presents a process flow for certain affiliations of the user of a system consistent with certain embodiments of the present invention. When the Tag and Tap™ software system is initiated by a mobile device at 300, the application will store and collect data within the application.

At 302, once the user taps the NFC tag, the Tag and Tap™ application will transmit a URL link to the mobile device which will alert the software system of pending data transmission for the data collecting computer for purposes of allowing an affiliated first communication device to communicate with a second communication device.

At 304, the Tag and Tap™ software system has the capacity to transmit dynamic links by utilizing all of the collected data from the data collecting computer. As a non-limiting example assume a mobile device is activated and is properly operating. To illustrate, where a user has previously tapped an NFC tag for purposes of receiving information, the application software system will continue to utilize collected data to correctly update URL links within a given period of time.

At 306, as an example, the system can also submit data to a cloud-based service such as Facebook, LinkedIn, Amazon, and other such mobile service providers, may receive data regarding collected data.

At 308, the Tag and Tap™ system will receive data via the data collecting computer.

At 310, the Tag and Tap™ system will allow a decision to be made regarding any activity performed by a user.

At 312, the Tag and Tap™ system will not transmit collected information to the data collecting computer if the user does not trigger a proximity beacon.

At 314, the Tag and Tap™ system will continuously update submitted data via the first communication device and time stamp in a non-volatile memory.

At 316, upon a user's request the Tag and Tap™ system offers alternative means of receiving historical data.

Figure 4:
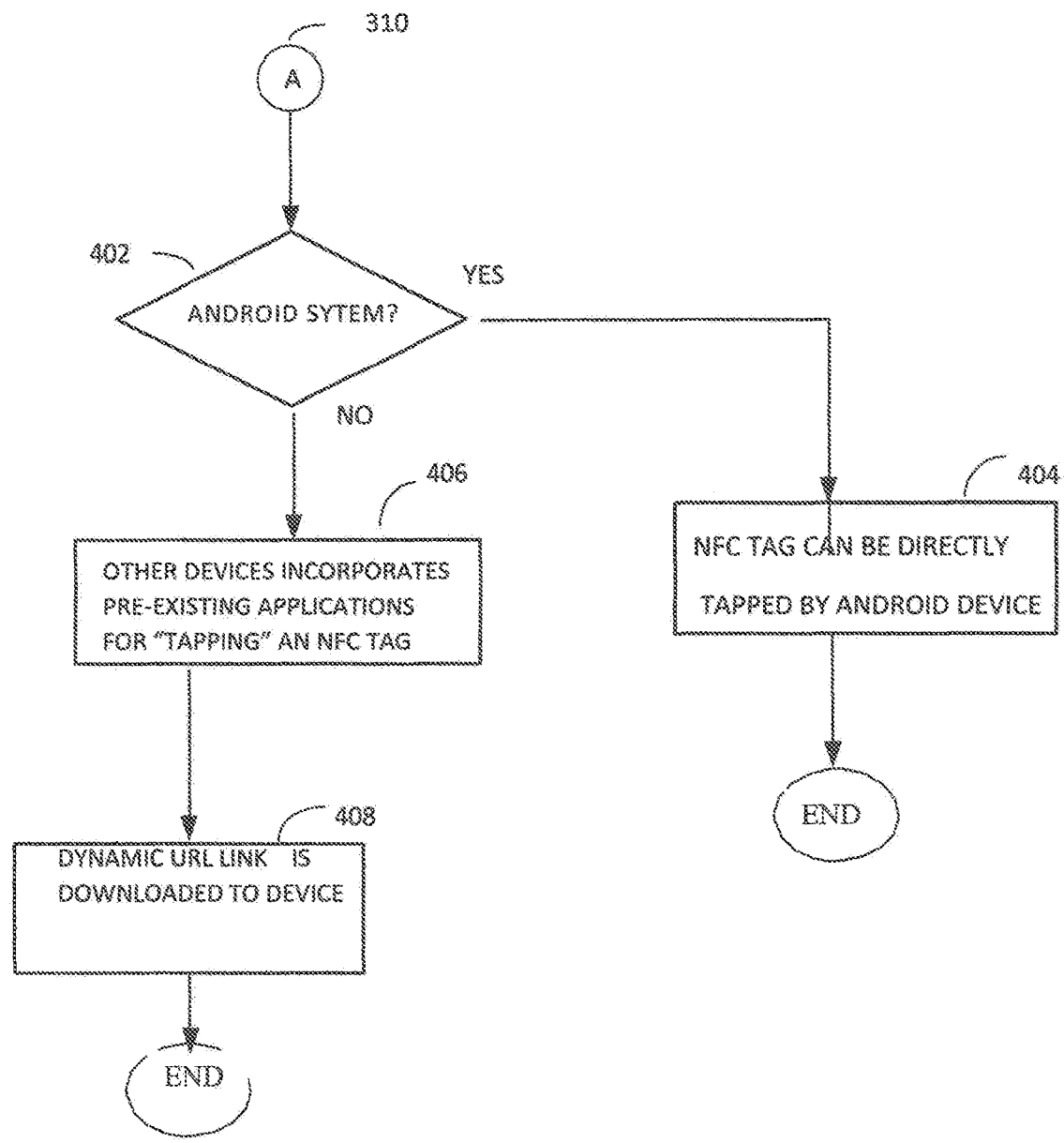
FIG. 4 is a process flow for the determination of critical data for the user of a mobile device consistent with certain embodiments of the present invention.

Turning to FIG. 4, this figure presents a process flow for the determination of certain affiliations of the user of a mobile device consistent with certain embodiments of the present invention 400.

At 402, when a mobile device interfaces with the Tag and Tap system an affiliation is submitted to the data collecting computer. In a non-limiting examples, the data collecting computer will make a determine whether the mobile device incorporates an Android system.

At 406, if the mobile device does not include an Android system or an iPhone 7, 8, or 10 then the mobile device will haves a pre-existing application to interface with the NFC tag.

At 404, if the data collecting, computer determines that the mobile device is in fact an Android system then the NFC tag can be directly tapped by the Android device without the need for a mobile application download.

At 408, a URL link will download once the mobile device has interfaced with the NFC tag.

While certain illustrative embodiments have been described, it is evident that many alternatives, modifications, permutations and variations will become apparent to those skilled in the art in light of the foregoing description.

What is claimed is:

1. A process for transmitting data to a first communication device when interfacing with an NFC tag; comprising the steps of:
   (a) interfacing with said NFC tag;
   (b) determining the first communication device's system affiliation;
   (c) if it is determined that the first communication device is an iphone 7, 8, or 10, then a Tag and Tap software application will need to be downloaded;
   (d) upon application download, a user will tap said NFC tag;
   (e) a URL link will be downloaded following said tap;
   (f) a second communication device receives and manipulates data;
   (g) determining whether the user has subscribed to a Tag and Tap subscription program;
   (h) data is submitted to said first communication device from said second communication device;
   (i) a decay period can be applied to all utilized data.

2. The process for transmitting data to a first communication device when interfacing with an NFC tag according to claim 1; wherein step (a) further comprises the user receiving data from the NFC tag.

3. The process for transmitting data to a first communication device when interfacing with an NFC tag according to claim 1; wherein in step (g) allows a retailer to subscribe to the Tag and Tap program.

4. The process for transmitting data to a first communication device when interfacing with an NFC tag according to claim 3; wherein in step (g) once said retailer has subscribed they may further automatically send push notifications to prior users.

5. The process for transmitting data to a first communication device when interfacing with an NFC tag according to claim 4; wherein in step (g) said retailer can retarget prior users for promotional purposes utilizing (BLE) technology.

6. The process for transmitting data to a first communication device when interfacing with an NFC tag to claim 1; wherein in step (i) a specified end date can be applied to said decay period.

* * * * *